United States Patent Office 2,863,891
Patented Dec. 9, 1958

2,863,891

METAL ORGANO-SILYL ESTERS

Felix E. Granchelli, Cambridge, and George B. Walker, Jr., South Acton, Mass., assignors to Arthur D. Little, Inc., Cambridge, Mass., a corporation of Massachusetts No Drawing. Application March 18, 1955
Serial No. 495,332

8 Claims. (Cl. 260—429)

This invention relates to a process for preparing new silicon-containing compounds and more particularly to metal organo-silyl esters having the general formula $[R_1R_2R_3SiO]_xM_yO_{z-x}$, where $R_1$, $R_2$ and $R_3$ are organic radicals of the classes generally referred to as alkyl, aryl, aralkyl and heterocyclic, and M is a metal taken from the group consisting of chromium, vanadium, molybdenum and tungsten.

Metal organo-silyl esters represented by the above formula are, to the best of our knowledge, new in the art. Several comparable carbon-containing esters have been made and found to be good corrosion inhibitors as described in a co-pending application Serial Number 428,381, filed May 7, 1954, in the name of Charles G. Harford, now Patent No. 2,816,051. These carbon counterparts to the silyl esters, although effective corrosion inhibitors, have the disadvantage of being somewhat unstable. Metal organo-silyl esters such as tris(triphenylsilyl) chromate have shown superior ability to inhibit corrosion and in addition the metal organo-silyl esters are more stable than the comparable carbon compounds. The increased stability exhibited by the silyl compounds is at least partially explainable in terms of bond strength, for it has been shown that 89.3 kilogram calories/mol are required to break an Si—O bond while only 70 kilogram calories/mol are required to break a C—O bond. Since stability over a long period of time is required of a substance forming part of or making up a corrosion inhibitor, the increased stability of the organo-silyls is a real advantage.

An object of this invention is to make metal organo-silyl esters heretofore unknown. Another object of this invention is to prepare metal organo-silyl esters, heretofore unknown, by a novel organic reaction. A further object is to make metal organo-silyl esters in good yields. Still a further object of this invention is to make corrosion inhibitors with stabilities greater than those of comparable carbon-containing compounds. These and other objects will become apparent in the discussion below.

The procedures for making the metal organo-silyl esters of this invention may be represented by two general types of organic reactions.

The first procedure comprises reacting a tri-substituted organo-silanol of the general formula $R_1R_2R_3SiOH$ with a compound such as $R_xM_yO_z$ which contains the desired $M_yO_z$ radical wherein M represents a metal. The reaction which takes place may be represented as follows:

$$R_xM_yO_z + x(R_1R_2R_3SiOH) \rightarrow$$
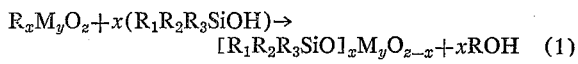  (1)

wherein $R_x$ may be hydrogen so that $R_xM_yO_z$ is an acid; $R_x$ may be an organic radical of the alkyl, aryl, alkylaryl or heterocyclic class so that $R_xM_yO_z$ is an ester; or $R_x$ may be a metal or alkali metal radical so that $R_xM_yO_z$ is an inorganic salt. In the compound represented by $R_1R_2R_3SiOH$, $R_1$, $R_2$ and $R_3$ may be hydrogen or organic radicals taken from the class of alkyl, aryl, aralkyl and heterocyclic. If $R_x$ is hydrogen and $R_xM_yO_z$ is an acid, then the above reaction represents a typical organic reaction between an alcohol-type compound and an inorganic acid. If $R_x$ is a metal or alkali metal radical and $R_xM_yO_z$ is an inorganic salt then, the reaction is a typical reaction between an alcohol-type compound and an inorganic salt to form an organic ester. If $R_x$ is an organic radical so that $R_xM_yO_z$ is an ester, then the reaction becomes an alcoholysis reaction. The resulting organic esters (chromates, vanadates, molybdates, and tungstates) have, as far as we know, never been prepared. As a matter of fact, although these general types of reactions, alcoholysis etc., are known they have not been applied before to the formation of the metal organo-silyl esters.

The second procedure for the production of metal organo-silyl esters involves what is believed to be a novel reaction between a halide-substituted organo-silane of the general formula $R_3'SiX$ and a compound expressed as $R_xM_yO_z$ as described above. The reaction which takes place may be represented as follows:

$$xR_3'SiX + R_xM_yO_z \rightarrow [R_3'SiO]_xM_yO_{z-x} + xRX \quad (2)$$

wherein $R_xM_yO_z$ is the same as in Equation 1 above and $R_3'SiX$ is a halogenated-substituted silane, in which R' is an organic radical taken from the class of alkyl, aryl, aralkyl or heterocyclic and X is a halogen.

Both reactions represented by Equations 1 and 2 are carried out at somewhat elevated temperatures in the presence of a liquid reaction medium which is a partial solvent or complete solvent for one or both of the reactants. Because the conditions under which the reactions are carried out permit the radicals $R_1R_2R_3$ in Equation 1 and $R_3'$ in Equation 2 to remain intact the possibilities of side reactions are minimized and good yields result. The by-products formed, ROH in Equation 1 and RX in Equation 2, will generally have low boiling points thus making them easy to remove.

Although the ratio of the reactants taking part in the reactions represented by Equations 1 and 2 are not critical, it has been found preferable to use them in the molar quantities indicated by balanced equations. This is possible because the reactions go to completion without the formation of any appreciable quantity of by-product. These facts mean that the work of separating out the final metal organo-silyl ester is minimized.

As pointed out above, in the compound represented by $R_xM_yO_z$, R may be an organic radical of the alkyl, aryl, alkaryl or heterocyclic class so that $R_xM_yO_z$ is an ester; it may be hydrogen so that $R_xM_yO_z$ is an acid; or it may be a metal or alkali metal radical so that $R_xM_yO_z$ is an inorganic salt. In $R_xM_yO_z$, the $M_yO_z$ radical may be the chromate $\equiv CrO_4$, the ortho-vanadate $\equiv VO_4$, the molybdate $\equiv MoO_4$ ort he tungstate $\equiv WO_4$. Thus $x$ is a whole number not exceeding 3 and $y$ and $z$ are whole numbers not exceeding 1 and 4, respectively.

Although there would appear to be a very large number of compounds usable in this process by virtue of the above definition, the number of acids, and hence their respective inorganic salts, are limited to the above acid radicals and the number of vanadate esters are limited to those stable ones which can be made. For example, the known stable vanadate esters are at present substantially limited to the triethyl, tripropyl, tri-n-butyl, tri-tertiary-butyl, tri-n-amyl and tri-iso-amyl. A method for preparing hitherto unknown organo-tungstate esters suitable for use in this invention is disclosed in co-pending patent application, Serial No. 517,898, filed in the names of Robert J. Bruni, Wallace J. Murray, and George B. Walker, Jr., on June 24, 1955, now abandoned.

In the silanol $R_1R_2R_3SiOH$ (Equation 1, $R_1$, $R_2$ and $R_3$ may be hydrogen or an organic radical belonging to the classes designated as alkyl, aryl, alkaryl and heterocyclic, $R_1$, $R_2$ and $R_3$ may all be identical or may be different members within the above-listed group. These silanols must be stable to the extent that they can be handled in air and that $R_1$, $R_2$ and $R_3$ remain intact throughout the reaction.

In the silanes, expressed in Equation 2 as $R'_3SiX$, $R'$ may be an organic radical taken from the classes of alkyl, aryl, aralkyl and heterocyclic.

The reactions are preferably carried out in a liquid medium which is a complete or partial solvent for one or both of the reactants. It is thought that better mixing and hence a more rapid reaction is possible if such a liquid medium is used. Suitable mediums include, but are not limited to, such liquids as glacial acetic acid, xylene, toluene, benzene, etc.

Reaction temperatures may range from about 30 to 130° C., depending upon the reactants employed, and the heat stabilities of the products formed. Reaction times may range from a few minutes to several hours. The resulting metal organo-silyl esters may be filtered off and dried by any of the standard laboratory procedures. Inasmuch as some of the metal organo-silyl esters are light sensitive, care must be taken not to decompose the resulting products by exposure to light.

Although both of the reactions represented by Equations 1 and 2 are equally effective in producing the metal organo-silyl esters disclosed here, the reaction of triaryl halo-silanes with $R_xM_yO_z$ (Equation 2) has the advantage of using a reactant which is more readily available. Actually, only a few silanols are known to exist while there are a number of the more available triaryl halo-silanes suitable for this reaction.

The following examples serve to illustrate preferred methods of preparing the metal organo-silyl esters of this invention. The scope of this invention is not, however, limited by these particular examples.

*Example I*

A mixture of 2.89 g. (0.01 mol) of tertiary-butyl vanadate and 8.89 g. (0.03 mol) of triphenylchlorosilane in dry xylene was refluxed for three hours in a 250 ml. single-neck flask equipped with a condenser and a drying tube. The resulting mixture was filtered, and the solvent was stripped under vacuum. The solid residue was washed with acetone, filtered and dried. This solid was recrystallized from xylene to give colorless crystals. The crude yield was about 40% of theoretical while the yield of the pure compound was about 30% of theoretical. Mixed melting point of this product with that from Example II showed them to be identical.

*Example II*

A mixture of 30 g. of vandadium pentoxide and 200 cc. of anhydrous t-butyl alcohol was refluxed for about 12 hours in a 500 ml. single-neck flask. The resulting product was filtered and the residual alcohol was removed under vacuum. The residue was dissolved in 100 ml. of xylene and a xylene solution of 10 g. of triphenylsilanol was added. This mixture was refluxed for about 12 hours and was filtered to remove any unreacted silanol. The xylene was removed from the final product by vacuum distillation. The light yellow solid residue was washed with acetone, filtered under a dry nitrogen stream and dried in a vacuum desiccator. The resulting tris(triphenylsilyl) vanadate was recrystllized twice from xylene. After drying in a vacuum desiccator, the crystals had a melting point of 228–229° C. The yield was about 30 to 40% theoretical. Analysis of the compound showed 6.07% vanadium as compared with a theoretical value of 5.70%.

*Example III*

A mixture of 55.28 g. (.2 mol) of triphenylsilanol and 10 g. (.1 mol) of chromic oxide, $CrO_3$, in 200 ml. of glacial acetic acid was heated at 50° C. for 10 minutes in a 400 ml. beaker. The resulting mixture was filtered and the solid residue was washed with water to neutrality, filtered, and dried. This solid was recrystallized from carbon tetrachloride to give pure orange crystals. The yield was about 85% of the theoretical for bis(triphenylsilyl) chromate and an analysis of the product showed 8.56% Cr, 68.4% C and 4.98 H, while the calculated values are 8.23%, 68.2%, and 4.74%, respectively.

By the processes herein disclosed, it is possible to produce a new series of compounds which may have wide and varied applications. The use of these silyl esters in corrosion inhibitor compositions has already been mentioned. Other uses may include catalysts in processes such as petroleum cracking (i. e., as a source of the vanadium or other metallic ions), screens for ultraviolet light, additives for improving the burning characteristics of fuel oils or propellants, oxidizing agents for oxidizing organic compounds in the gaseous state and especially in liquid oxidation procedures, and as driers in paints and varnishes. For example, when used as an ultra-violet light screen, one or more of these silyl esters may be added to various lacquers or resinous compositions to block out undesirable short light wave radiations, or they could be added to such materials as nitrocellulose or cellulose acetate sheeting to exclude harmful light rays.

We claim:

1. A process for making tris(triphenylsilyl) vanadate which comprises refluxing tertiary-butyl vanadate with triphenylchlorosilane in a waterfree, aromatic hydrocarbon liquid, filtering out unreacted components and removing said liquid from the tris(triphenylsilyl) vanadate thus formed, said liquid being at least a partial solvent for at least one of the reactants and unreactive therewith, said refluxing being carried out at a temperature between about 30° and 130° C. and below that temperature at which decomposition of said reactants takes place, and for a time sufficient to effect formation of said tris(triphenylsilyl) vanadate.

2. A process for making tris(triphenylsilyl) vanadate which comprises refluxing tertiary-butyl vanadate with triphenylsilanol in a water-free, aromatic hydrocarbon liquid, filtering out unreacted components and removing said liquid from the tris(triphenylsilyl) vanadate thus formed, said liquid being at least a partial solvent for at least one of the reactants and unreactive therewith, said refluxing being carried out at a temperature between about 30 and 130° C. and below that temperature at which decomposition of said reactants takes place, and for a time sufficient to effect formation of said tris(triphenylsilyl) vanadate.

3. A process for making tris(triphenylsilyl) vanadate which comprises refluxing at a temperature below about 130° C. in stoichiometric ratios, tertiary-butyl vanadate with triphenylchlorosilane in dry xylene, filtering out unreacted components and removing said xylene from the tris(triphenylsilyl) vanadate thus formed, washing and drying said tris(triphenylsilyl) vanadate.

4. A process for making tris(triphenylsilyl) vanadate which comprises refluxing at a temperature below about 130° C. in stoichiometric ratios, tertiary-butyl vanadate with triphenylsilanol in xylene, filtering out unreacted components and removing said xylene from the tris(triphenylsilyl) vanadate thus formed, washing and drying said tris(triphenylsilyl) vanadate.

5. A process for making bis(triphenylsilyl) chromate which comprises refluxing triphenylsilanol and chromic oxide in a non-aqueous liquid, and filtering out the bis(triphenylsilyl) chromate thus formed, said liquid being at least a partial solvent for at least one of the reactants and unreactive therewith, said refluxing being carried out at a temperature between about 30 and 130° C. and below that temperature at which decomposition of said reaction takes place, and for a time sufficient to effect formation of said tris(triphenylsilyl) chromate.

6. A process for making bis(triphenylsilyl) chromate which comprises heating at about 50° C. in stoichiometric ratios, triphenylsilanol and chromic oxide in glacial acetic acid, filtering out the bis(triphenylsilyl) chromate, washing with water to neutrality and drying said bis(triphenylsilyl) chromate.

7. Tris(triphenylsilyl) vanadate.

8. Bis(triphenylsilyl) chromate.

References Cited in the file of this patent

UNITED STATES PATENTS 2,512,058   Gulledge _____ June 20, 1950